Figure 1:
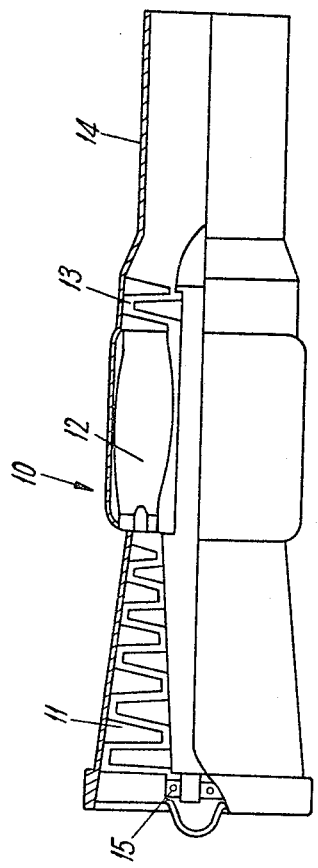

May 30, 1967   W. J. DAVIES ETAL   3,321,910
GAS TURBINE LUBRICATION

Filed Aug. 23, 1965   2 Sheets-Sheet 1

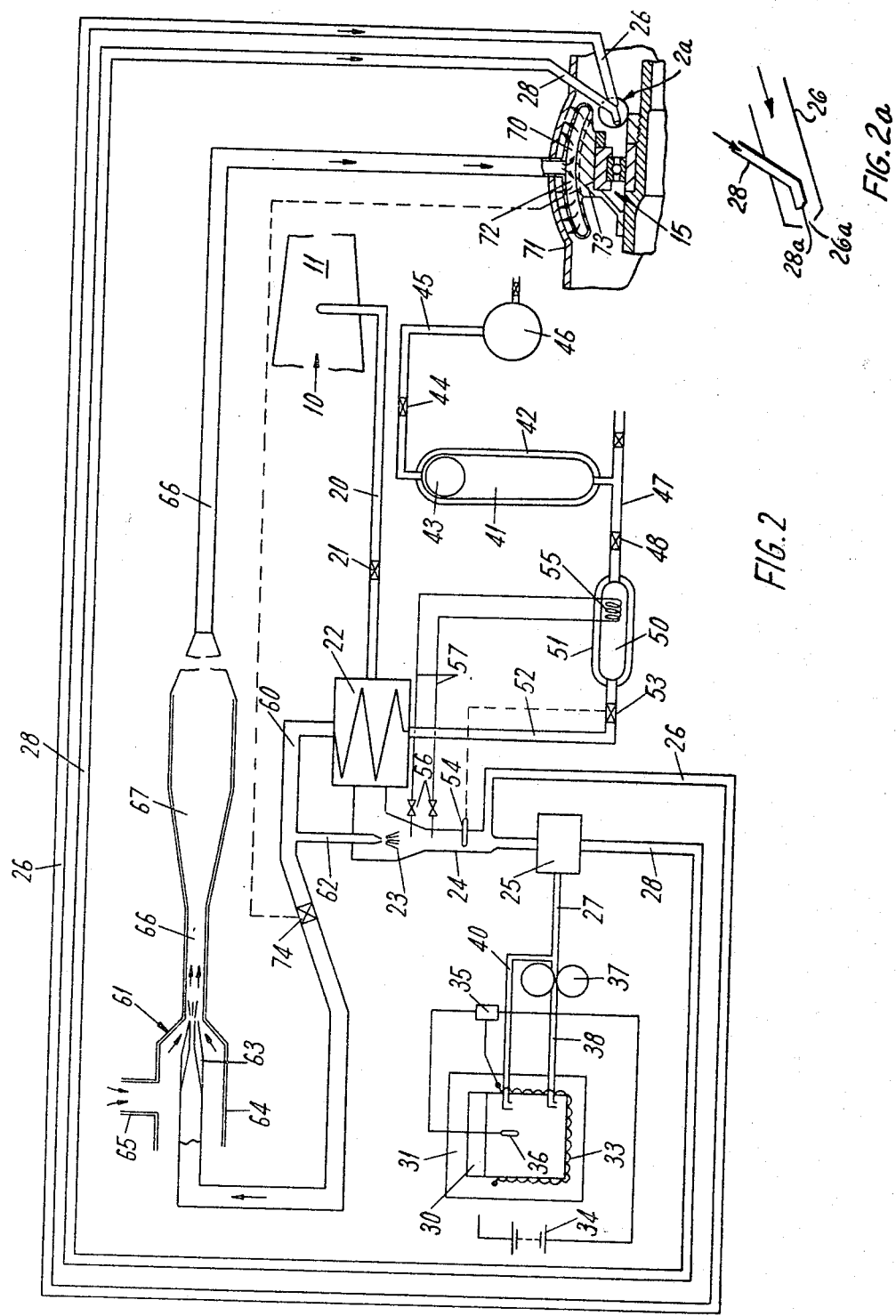

3,321,910
GAS TURBINE LUBRICATION
William John Davies, Spondon, Derby, Roy Allen, Long Eaton, and John Kenneth Rhodes, Littleover, Derby, England, assignors to Rolls-Royce Limited, Derby, England, a British company
Filed Aug. 23, 1965, Ser. No. 481,580
Claims priority, application Great Britain, Sept. 4, 1964, 36,435/64
11 Claims. (Cl. 60—39.08)

This invention concerns gas turbine jet propulsion engines and, in particular, means for lubricating and cooling a component thereof.

According to the present invention there is provided a gas turbine jet propulsion engine including a component requiring lubrication and cooling and means for lubricating and cooling the component, said means comprising sources of air and oil, a mixer for mixing the oil and air together to form an oil mist, a first duct for conveying said oil mist to said component, a second duct for conveying air to said component and means for mixing the conveyed oil mist and air together at the component to dilute the oil mist and direct it onto said component.

It will be appreciated that the oil of the oil mist is used to lubricate the component and the air is employed to cool the component. The oil/air ratio is a predetermined quantity dictated by the operating conditions of the component. The maximum velocity at which the mist may be conducted in a pipe or duct without "wetting out" (i.e., separation of the oil and air) occurring is thus known, and this velocity must not be exceeded in conducting the mist to the component. From the volume of mist required (also known from the operating characteristics) the size of duct required to conduct the mist at a velocity below the maximum set forth above, is determined. It has been found that the duct size required by a component (e.g., a bearing) of a gas turbine engine far exceeds that reasonably usable in an aircraft installation. It is therefore proposed that a "rich" mist be conducted to the bearing and the correct oil/air mixture be obtained at the component by mixing it with further air also conducted separately to the component. In this way, a larger velocity may be used for the mist since it is richer, and thus a smaller diameter pipe may be employed. A consequent saving in weight and space as well as cost is achieved by this arrangement, using two small ducts instead of one large duct, and these are obvious advantages in jet propulsion engine design.

Preferably the ducts are concentrically arranged at said component and terminate in nozzles whereby the oil mist and air mix are directed onto said component upon leaving said ducts.

The air source may be the or a compressor of said engine part of the air bled therefrom being conducted to said mixer and part being conducted directly through said second duct.

In a preferred embodiment the air bled from the engine compressor is cooled by passage through a heat exchanger. The coolant used in the heat exchanger may be employed in an injector pump to pump said air to the mixer and said second duct.

The coolant may also be conducted in a third duct to said component to be employed in providing a heat shield for said component. The coolant may be mixed with air prior to reaching said component. For this purpose the third duct preferably includes an aspirator pump through which said coolant flows to draw air into said third duct for mixing with said coolant.

The component may be the main bearing of the engine, nitrogen being the coolant.

The invention also includes an aircraft provided with an engine as set forth above. Such an aircraft may be capable of speeds of the order of Mach 3.

The invention is illustrated, merely by way of example, in the accompanying drawings in which:

FIGURE 1 is a diagrammatic cut away view of a gas turbine engine in accordance with the present invention, FIGURE 2 is a schematic arrangement of part of the engine of FIGURE 1, and FIGURE 2a is an enlarged sectional view through part of FIGURE 2 enclosed within the circle 2a.

Referring to FIGURE 1 of the drawings, a gas turbine engine 10 includes a compressor 11, combustion equipment 12, turbine 13 and jet pipe 14. A main bearing 15 of the engine is lubricated and cooled by the arrangement shown in more detail in FIGURE 2.

Referring to FIGURE 2 air is bled from compressor 11 through a duct 20 including a pressure reducing valve 21 to a heat exchanger 22. Cooled air from heat exchanger 22 is pumped by an injector pump 23 into a duct 24. Part of the cooled air passes through an oil/air mixer 25 and part of the air passes through a duct 26. Oil is introduced into mixer 25 through a pipe 27, and the oil/air mixture formed passes through a duct 28.

Ducts 26 and 28 are led to the main bearing 15 where they are arranged concentrically and terminate in respective nozzles 26a, 28a (FIGURE 2a) whereby the oil/air mixture from duct 28 mixes with the air from duct 26 to form an oil/air mist of the correct consistency and direct it onto the bearing 15.

It will be appreciated that the use of separate ducts for the oil/air mist and air means that the duct for the oil/air mist may be appreciably smaller for a given flow of mist of predetermined ratio without "wetting out" occurring.

The arrangement illustrated is adapted for use in an aircraft capable of Mach 3 and special heating and cooling arrangement of the oil and air respectively are employed in this arrangement. However, none of the features described below need necessarily be employed on all aircraft or in all engines, and the simple device described above may be quite suitable for some normal sub-sonic engine installations.

Oil for mixer 25 is stored in a tank 30 surrounded by an insulating jacket 31. An electrical heater 33 surrounds the tank and heats the oil, the power supply from a source 34 being regulated by a temperature sensitive control switch 35 connected to a thermometer 36 within the oil tank. Oil is pumped from tank 30 to pipe 27 by an engine driven gear pump 37 through an outlet 38. Any excess oil not required in pipe 27 and mixer 25 flows back to tank 30 via pipe 40.

Heat exchanger 22 is of the two-cycle type employing two sections one of which is supplied with coolant whilst the other is cut off from the coolant supply. The hot air to be cooled flows through both sections at all times and thus whilst hot air is being cooled in one section, the other section is being warmed by hot air. A switch over valve is provided such that the sections may be used alternately and thus any ice forming during the heat exchanger process may be melted off when the section is warmed by the hot air.

The coolant employed is liquid nitrogen stored within a tank 41 insulated by a jacket 42. An expandable bladder 43 is provided in the end of tank 41. The bladder 43 communicates, via a pressure reducing valve 44 in a pipe 45 with a tank 46 of helium gas. By controlling the flow of helium to bladder 43 the size of the bladder may be regulated and thus the flow of nitrogen from tank 41 may be controlled.

Nitrogen from tank 41 flows through a duct 47 containing a shut off valve 48 through an auxiliary tank 50 insulated by a jacket 51 and through a duct 52 containing a control valve 53 to the heat exchanger 22. A thermocouple 54 is connected to and controls valve 53 whereby the amount of nitrogen fed to heat exchanger 22 varies in accordance with the temperature of the cooled air leaving the heat exchanger and flowing through duct 24.

Auxiliary tank 50 is included to provide an emergency supply of nitrogen when the tank 41 is empty. A pressurising coil 55 is disposed within the tank 50 and by controlling flow of air from duct 24 via on/off valves 56, through pipes 57 the nitrogen within tank 50 may be pressurised and thus forced out of the tank to the heat exchanger 22.

The nitrogen leaving heat exchanger 22 is gaseous and this flows, through a duct 60 to an aspirator pump 61. Part of the gaseous nitrogen is tapped from duct 60 through a pipe 62 and flows into duct 24 through a nozzle forming part of pump 23. Thus this gaseous nitrogen is used to pump air through duct 24, mixing with the air at the same time.

Duct 60 terminates in a nozzle 63 forming part of pump 61. A chamber 64 communicating via a duct 65 with air from the intake to the engine or with air from another stage of the compressor of the engine surrounds nozzle 63. The flow of nitrogen through nozzle 63 induces air to flow through chamber 64 and into a duct 66, the air and nitrogen mixing therein. An expansion chamber 67 is provided in duct 66, and the nitrogen/air mixture expanding therein is cooled. Duct 66 conduts the nitrogen/air mixture to a chamber 70 surrounding bearing 15. The cooled mixture within chamber 70 acts as a heat shield for the bearing and thus protects it from the hot engine casing 71 within which the bearing is disposed. The outer wall 72 of the chamber 70 may be porous such that the mixture in chamber 70 may flow out of the chamber, forming a further insulating barrier between wall 72 and casing 71. The arrangement of bearing 15 and chamber 70 may be of the form described and claimed in our co-pending application No. 36,437/64.

A thermocouple 73 is disposed closely adjacent bearing 15 to sense the temperature thereof. Signals from the thermocouple are transmitted to a control valve 74 in duct 60 to control flow of gaseous nitrogen therethrough in accordance with the temperature of the bearing 15.

It will be appreciated that the system described above could be employed to lubricate and cool gears and splines, for example, instead of a bearing of the engine.

It will be appreciated that the arrangement described may be modified. Thus the nitrogen used in heat exchanger 22 may be condensed after passage therethrough and returned to tank 41. In this case the heat shielding provided by chamber 70 may be provided by some other source, or need not be provided at all if the temperature of the bearing is not excessive.

We claim:
1. A gas turbine engine including a component requiring lubrication and cooling, and means for lubricating and cooling the component, said means comprising sources of air and oil, a mixer for mixing the oil and air together to form an oil mist, a first duct for conveying said preformed oil mist to said component, a second duct for conveying air to said component, respective nozzles at the ends of said ducts, said nozzles being disposed closely adjacent each other and arranged to cause mixing of the oil mist and air passing therethrough at the component to dilute the oil mist and to direct the diluted oil mist onto said component.

2. A gas turbine engine as claimed in claim 1 in which said nozzles are concentrically arranged at said component.

3. A gas turbine engine as claimed in claim 1 in which the source of air comprises a bleed duct supplied by a compressor of the engine which supplies compressed air to said mixer and to said second duct.

4. An engine as claimed in claim 3 including a heat exchanger in which the air bled from the compressor is cooled.

5. A gas turbine engine as claimed in claim 4 including an ejector pump arranged to pump the cooled air from the heat exchanger to the mixer and said second duct, the operating fluid for said pump being the coolant for said heat exchanger.

6. An engine as claimed in claim 5 wherein the coolant is nitrogen.

7. A gas turbine engine as claimed in claim 4 including a heat shield for the component and a third duct conveying coolant from the heat exchanger to the heat shield.

8. An engine as claimed in claim 7 including an aspirator pump in said third duct through which said coolant flows to draw air into said third duct for mixing with said coolant.

9. A gas turbine jet propulsion engine as claimed in claim 1 in which the component requiring lubrication and cooling is a main bearing of the engine.

10. In a supersonic aircraft, a gas turbine jet propulsion engine including a main bearing requiring lubrication and cooling and means for lubricating and cooling the bearing, said means comprising sources of air and oil, a mixer for mixing the oil and air together to form an oil mist, a first duct for conveying said oil mist to said bearing, a second duct for conveying air to said bearing, respective nozzles at the ends of said ducts, said nozzles being disposed closely adjacent each other and arranged to cause mixing of the oil mist and air passing therethrough at the bearing to dilute the oil mist and to direct the diluted oil mist onto said bearing.

11. A gas turbine as claimed in claim 1 wherein said nozzles are disposed close to and directed directly towards said component.

References Cited

UNITED STATES PATENTS

| | | | |
|---|---|---|---|
| 2,584,899 | 2/1952 | McLeod | 308—76 X |
| 2,740,267 | 4/1956 | Bayard. | |
| 2,789,922 | 4/1957 | Allen. | |
| 2,886,133 | 5/1959 | Mauck et al. | 60—39.08 X |
| 2,986,433 | 5/1961 | Herrmann | 308—187 |

OTHER REFERENCES

Aero-Digest, July 1948, Vol. 57, No. 1 (pp. 58–60 and 95 relied on). Class 60-39.08.

CARLTON R. CROYLE, *Primary Examiner.*